United States Patent

[11] 3,596,222

| [72] | Inventor | Elio Pagella |
| | | Torino, Italy |
| [21] | Appl. No. | 856,298 |
| [22] | Filed | Sept. 9, 1969 |
| [45] | Patented | July 27, 1971 |
| [73] | Assignee | Ing. C. Olivetti & Co., S.p.A. |
| | | Ivrea, Turin, Italy |
| [32] | Priority | Oct. 9, 1968 |
| [33] | | Italy |
| [31] | | 53410/68 |

[54] PRECISION ELECTRIC TRANSDUCER FOR POSITION MEASURING ON MACHINE TOOLS
5 Claims, 5 Drawing Figs.

[52] U.S. Cl. .................................................. 336/129, 336/123
[51] Int. Cl. .................................................. H01f 21/04
[50] Field of Search .......................................... 336/115, 123, 129

[56] References Cited
UNITED STATES PATENTS
3,202,948   8/1965   Farrand ........................ 336/123 X 3,249,854   5/1966   Neirus ............................ 336/129 X
3,281,746  10/1966   Buntschuh ..................... 336/123
3,332,144   7/1967   Buntschuh ..................... 336/123 X

*Primary Examiner*—Lewis H. Myers
*Assistant Examiner*—Gerald P. Tolin
*Attorney*—Birch, Swindler, McKie & Beckett ABSTRACT: A machine tool position measuring precision transducer or detector comprises a pair of electrical windings secured to a pair of relatively movable members, which are mutually coupled through precision guiding means to maintain the airgap between the windings constant along the facing planes. If the movable member is a slide the guiding means comprises a C-shaped section having a pair of opposite recesses facing a pair of grooves of a guide, a plurality of calibrated cylindrical sliding blocks being interposed between the grooves and the recesses. If the movable member is a rotatable disc the guiding means comprises a plurality of calibrated balls interposed between the disc and the stationary member, a ring nut exerting an axial thrust on the disc to hold same always in contact with the balls.

PATENTED JUL 27 1971 3,596,222
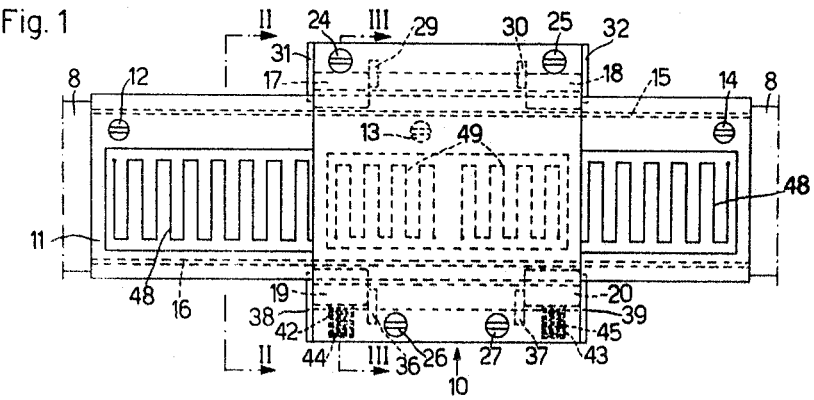
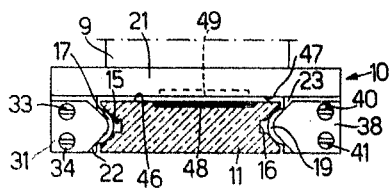
Fig. 2
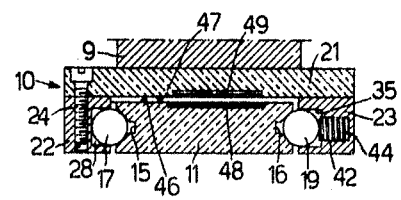
Fig. 3
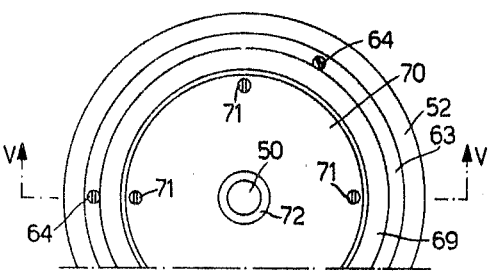
Fig. 4
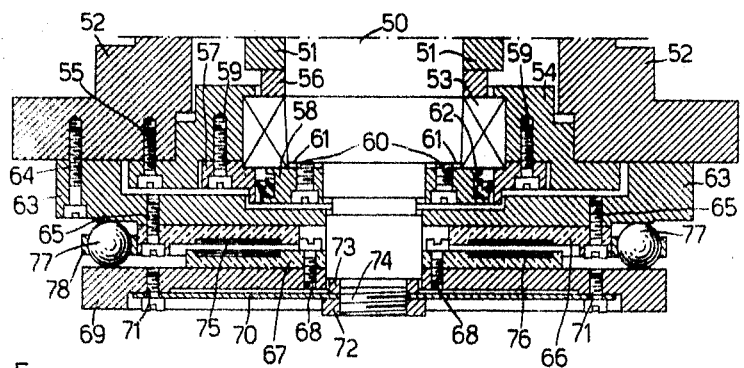
Fig. 5
INVENTOR
ELIO PAGELLA

PRECISION ELECTRIC TRANSDUCER FOR POSITION MEASURING ON MACHINE TOOLS

BACKGROUND OF THE INVENTION

1. Field of the Invention

The present invention relates to a position measuring precision transducer or detector, for example for devices for controlling machine tools and similar machines, adapted to measure the relative movement between a first and a second part which are movable one with respect to the other.

2. Description of the Prior Art

In known detectors, electrical windings fast with the two parts are disposed in two facing plates separated by a slight airgap for the purpose of achieving an inductive coupling between them when one of the windings is energized.

In one known device fitted to a machine tool, a continuous electrical winding and a winding a quadrature are provided. The windings are fixed by means of insulating elements to the bed and the slide, respectively, of the machine. Inasmuch as the slide moves with respect to the bed by sliding in guides the surfaces of which may be uneven, errors are introduced into the measurements of the position detector and must be corrected. In order to eliminate or compensate for these errors, there are employed two or more position detectors the continuous windings of which are disposed substantially parallel and are fixed to one of the parts of the machine. The windings in quadrature of the detectors are fixed to the other part of the machine and are connected in series and fed by the same source. There are moreover means for combining the output signals from the continuous windings of the detectors. This solution of an electrical nature is complicated and costly, however inasmuch as it requires the use of a plurality of detectors, and moreover, of a potentiometer.

In another typical application, in which detection of the angular position of a rotatable shaft is required, the windings of the detectors are fixed to two coaxial discs of insulating material constituting the stator and the rotor, respectively, of the detector. The stator disc is connected to the casing of the detector by means of a series of leaf springs, while the rotor disc is connected to a hub rotatably in the casing by means of another series of leaf springs, in order to compensate for any variations in the airgap between the stator and the rotor which are due to temperature variations. On the other hand, in order to compensate for off-centering or disalignment of axis between the insulating discs supporting the windings, supplementary bearings or flexible coupling are provided. To avoid the use of supplementary bearings, the insulating discs supporting the windings have also been fixed directly to the parts of the machine of which it is desired to detect the relative position. In this case, however, adjusting screws are necessary for suitably calibrating the airgap.

SUMMARY OF THE INVENTION

The object of the present invention is to ensure constance of the air gap in a simple and improved way.

According to the invention there is provided a position detector for measuring the relative movement between first and second parts wherein electrical windings disposed in two facing planes separated by a small airgap are mounted on two members which are so mechanically coupled as to maintain the airgap constant and are mechanically coupled to the first and second parts respectively in such a manner as to permit relative movement between these parts in a direction normal to the airgap.

The invention will be described in more detail, by way of example, with reference to the accompanying drawings.

FIG. 1 is a diagrammatic plan view of a linear position transducer or detector according to a first embodiment of the invention FIG. 2 is a section on the line II–II of FIG. 1;

FIG. 3 is a section on the line III–III of FIG. 1;

FIG. 4 is a partial plan view of a rotary position detector according to a second embodiment of the invention;

FIG. 5 is a section on a larger scale on the line V–V of FIG. 4.

DESCRIPTION OF THE PREFERRED EMBODIMENTS

According to a first embodiment of the invention, the transducer or detector is of a linear-type, that is of the type having two parts movable one with respect to the other along a rectilinear path. The two parts are formed of a slide 9 (FIG. 3) and a bed 8 (FIG. 1) of a machine tool and are secured to a slider 10 and a scale 11, respectively. The scale 11 is fixed to the bed 8 of the machine by means of screws 12, 13 and 14. The slide 9 (FIG. 3) supports the worktable of the machine, for example in a known manner which allows a relative movement of the slider with respect to the scale itself. The slider 10 is mechanically coupled to the scale 11 by means of two prismatic guides 15 and 16 and four calibrated cylindrical sliding blocks 17, 18, 19 and 20.

The guides 15 and 16 are represented by two longitudinal grooves which are formed on two opposite sides of the scale 11. The section of the grooves is substantially V-shaped and the base thereof is further recessed in the form of a channel of rectangular section. This profile of the guides 15 and 16 has been adopted to allow of grinding the same for the purpose of reducing to the minumum the friction developed through the effect of the sliding of the sliding blocks 17, 18, 19 and 20 on the guides.

The slider 10 essentially comprises a plate 21 (FIGS. 2 and 3) parallel to the scale 11 and two sections 22 and 23 fixed to the plate 21 by means of screws 24 and 25, 26 and 27, respectively (FIG. 1). The sections 22 and 23 are disposed facing one another and parallel to the guides 15 and 16, respectively (FIG. 3).

On the side facing the guide 15, the section 22 is provided with a longitudinal recess 28 of C-shaped section in which two pins 29 and 30 (FIG. 1) are fixed. Two plates 31 and 32 are fixed by means of screws 33 and 34 (FIG. 2) to the two ends of the section 22 in such manner as to close the recess 28. The sliding block 17 is inserted in the recess 28 between the pin 29 and the plate 31 (FIG. 1); the sliding block 18 is inserted in the recess 28 between the pin 30 and the plate 32.

Similarly, on the side facing the guide 16, the section 23 is provided with a longitudinal recess 35 (FIG. 3) of C-shaped section in which two pins 36 and 37 (FIG. 1) are fixed. Two plates 38 and 39 are fixed by means of screws 40 and 41 (FIG. 2) to the two ends of the section 23 in such manner as to close the recess 35. The sliding block 19 is inserted in the recess 35 between the pin 36 and the plate 38; the sliding block 20 is inserted in the recess 35 between the pin 37 and the plate 39.

In the section 23 there are moreover formed two seats 42 and 43 (FIG. 1) in which two springs 44 and 45, respectively, are housed. The springs 44 and 45 are precompressed and partly emerge from the seats 42 and 43 to act directly on the sliding blocks 10 and 20, respectively. The resilient action of the springs 44 and 45 is transmitted via the scale 11 to the sliding blocks 17 and 18 and permanently ensures continuous contact of the sliding blocks 17, 18, 19 and 20 with the guides 15 and 16.

The scale 11 and the plate 21 have two facing surfaces 46 and 47, respectively (FIGS. 2 and 3). An electrical winding 48, generally in the form of a rectangular wave, is embedded in the surface 46 of the scale 11. Similarly, two windings 49 (FIG. 1), also of rectangular wave form, are embedded in the surface 47 of the plate 21. Normally, the windings 48 and 49 have the same pitch, but the two windings 49 are out of phase by 90°, so that by applying an alternating-current voltage to the winding 48 pulsating magnetic fields are produced and induce secondary voltages out of phase by 90° in the windings 49. The detection of the positions of the slider is obtained precisely on the basis of the variations in these secondary voltages.

The mechanical coupling between the slider 10 and the scale 11 enables the airgap between the windings 48 and 49 to be kept strictly constant, since the sliding blocks 17, 18, 19 and 20 are always kept in contact with the guides 15 and 16. High-precision machining of the elements supporting the scale and the slider to be coupled can therefore be saved. Moreover, the simplicity and the compactness of the detector permit rapid fitting thereof to a wide range of machines, In fact, the detector can be assembled as an independent device before fixing to the machine and can then be fixed to the machine by means of the screws 12, 13 and 14.

According to another embodiment of the invention, the detector is of rotary type, in which the two parts are constituted by a first and a second disc rotatable concentrically one with respect to the other. The two parts are connected in such manner as to permit of detecting the angular position of a rotatable table with respect to its support fixed, for example, to a work slide of a machine tool. A shaft 50 (FIGS. 4 and 5), which rotates be being driven in known manner by a motor not shown in the drawings, is fast with the table 51. The shaft 50 is rotatable with respect to the bed 52 through the medium of a taper roller bearing 53 and a flange 54 (FIG. 5). The flange is fixed to the bed 52 by means of screws 55. The bearing 53 is mounted on the shaft 50 between a spacing ring 56, a clamping ring 57 and a sealing ring 58. The ring 57 is fixed to the flange 54 by screws 59. The ring 58 is fixed by means of screws 60 to a shoulder 61 of the shaft 50 and is provided at its periphery with a packing 62, normally of rubber, which prevents the passage of lubricant from the bearing 53 towards the electrical windings of the detector.

The fixed part of the detector comprises a stator disc 63 mounted centrally on the shaft 50 and fast with the bed 52 of the machine by means of screws 64. A disc 66 of nonmagnetic material is fixed to the stator 63 by means of screws 65. The rotatable part of the detector comprises a second disc 67 of nonmagnetic material disposed parallel to the disc 66 and fixed by means of screws 68 to a rotor disc 69 connected to the end of the shaft 50. Connection between the rotor 69 and the shaft 50 is obtained by means of a flexible disc 70 fixed by screws 71 to the rotor 69 and clamped by means of ring nut 72 against a ring 73 keyed on the shaft 50. The ring nut 72 is screwed on to a threaded portion 74 at the end of the shaft 50. The thickness of the ring 73 must be such as to permit a predetermined initial load on the disc 70 by tightening the ring nut 72.

In the facing surfaces of the discs 66 and 67 there are embedded windings 75 and 76, respectively, of the detector. The wave-shape of these windings and the principle of operation of the rotary detector are entirely similar to the shape and principle hereinbefore described in the case of the linear detector.

A series of calibrated balls 77 are interposed between the stator 63 and the rotor 69 and are rotatable in a bearing 78 centered on the periphery of the disc 66. The balls 77 ensure that the airgap between the windings 75 and 76 remains constant during the rotation of the shaft 50 due to the mechanical coupling achieved between the stator and the rotor of the detector. In fact, the screwing of the ring nut 72 on to the threaded portion 74 of the shaft 50 is translated into an axial stress which tends to urge the rotor 69 towards the stator 63, so that the balls 77 are in contact with both said discs. The disc 70, due to its relative flexibility, moreover permits limited axial movements of the shaft 50 and maintains the constancy of the airgap along the circumferential extent of the windings of the detector.

Finally, like the detector of linear-type, the rotary detector is also simple and compact and is adapted to be fitted rapidly to a wide range of machines. The detector can be assembled as an independent device and can then be mounted on the machine by means of the screws 64. This solution enables repeated mounting and removal of the detector to be effected without having to repeat the setting up of the rotor 69 and the stator 63.

It is understood that modifications, improvements or additions of parts may be made in the detector described without departing from the scope of the invention In the case of the linear detector, for example, the sliding blocks 17, 18, 19 and 20 may be replaced by calibrated balls, or the sections 22 and 23 may have recesses of V-shaped section similar to those of the guides 15 and 16 and coupling between the sections of the slider 10 and the guides of the scale 11 may be effected by means of rollers having intersecting axes.

I claim:

1. In a precision electric transducer for position measuring on machine tools having a pair of parts relatively slidable with respect to each other along a rectilinear path, a pair of members, each one of said members being secured to a respective one of said parts, a pair of facing planes, each one of said planes being on a respectively one of said members, a pair of windings, each one of said windings being disposed on a respective one of said planes and said windings being so separated from each other by an airgap of predetermined magnitude as to achieve an inductive coupling when at least one of said windings is supplied with an electric signal, the improvement comprising at least a pair of spaced opposed recesses on one of said members, a grooved guide carried by the other of said members and interposed between said opposed recesses, at least a pair of grooves in said guide, one of said grooves facing each of said recesses, a plurality of calibrated generally cylindrical sliding blocks inserted between said grooves and said recesses in such a manner as to insure that the magnitude of said airgap remains constant during the relative movement of said pair of parts.

2. A precision electric transducer according to claim 1, comprising at least a plurality of plates closing the ends of said recesses, and a pair of pins fixed in each of the recesses, each plate and pin holding the corresponding sliding block in position longitudinally.

3. A precision electric transducer according to claim 1, comprising at least one seat in each of said recesses, and a spring inserted in each and change said seat to force sliding blocks against said guide.

4. In a precision electric transducer for precision measuring on machine tools having a pair of parts relatively movable in a predetermined direction, a pair of members each one secured to one of said parts, a pair of facing planes on said members, a pair of windings disposed on said planes and separated by a predetermined air gap for achieving an inductive coupling therebetween when at least one of said windings is supplied with an electric signal, a first guide carried by one of said parts, and a second guide carried by the other of said parts, the improvement comprising a plurality of elements located between said first guide and said second guide and movable with one of said members in said predetermiend direction, said guides being so shaped as to cause said windings to be separated by said predetermined airgap, and yieldable means urging said intermediate elements in another direction to cause said element to constantly contact one of said guides, whereby said airgap is maintained constant.

5. In a precision electric transducer for position measuring on machine tools having a pair of parts concentrically rotatable with respect to each other, a pair of discs, each one of said discs being carried by a respective one of said parts, a pair of facing planes, each one of said planes being on a respective one of said discs, a pair of windings, each of said windings being disposed on a respective one of said planes and said windings being separated by an airgap of predetermined magnitude so as to achieve an inductive coupling when at least one of said windings is supplied with an electric signal, the improvement comprising a plurality of calibrated balls interposed circumferentially between said pair of discs, and wherein one of said discs is coupled to its respective one of said parts by means of a third disc interposed between said one disc and said respective part, said third disc being flexible so as to compensate for axial movement between said pair of parts, and means exerting an axial thrust on said third disc to hold said pair of discs in contact with said balls so that said air gap remains constant during relative rotation of said pair of discs independently of the relative axial movement of said parts.